May 13, 1930.  T. L. FAWICK  1,757,995
TRANSMISSION
Filed June 24, 1926   3 Sheets-Sheet 1

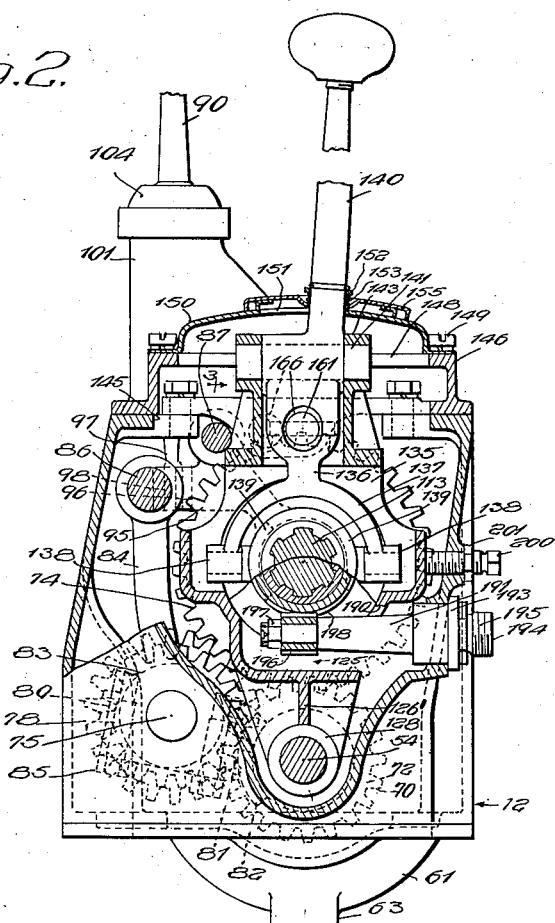
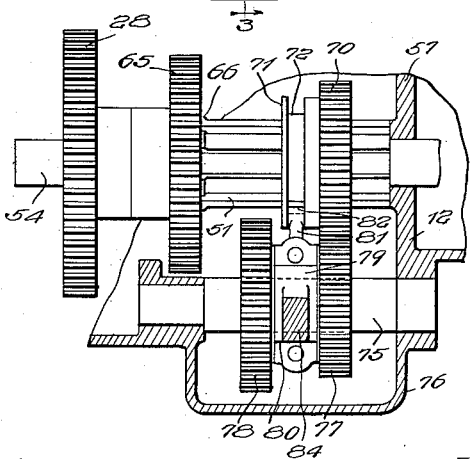

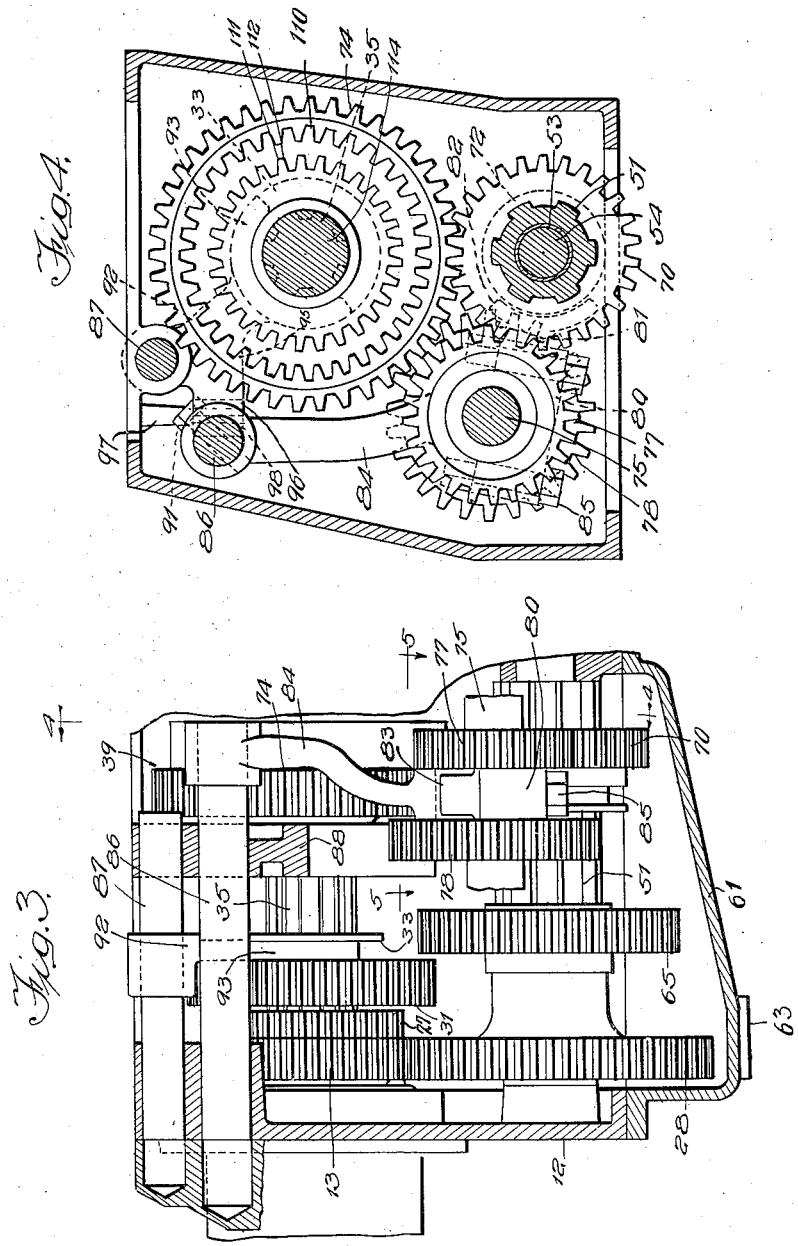

Patented May 13, 1930

1,757,995

UNITED STATES PATENT OFFICE

THOMAS L. FAWICK, OF RACINE, WISCONSIN, ASSIGNOR TO BROWN-LIPE GEAR COMPANY, OF SYRACUSE, NEW YORK, A CORPORATION OF NEW YORK

TRANSMISSION

Application filed June 24, 1926. Serial No. 118,203.

My invention pertains to change speed gearing and more particularly to transmissions of the same general character as that disclosed in my three Patents, No. 1,495,782, No. 1,515,850 and No. 1,524,476.

I propose to provide an improved transmission particularly adapted for use in conjunction with motor vehicles, which I preferably call a six speed transmission and capable of six different forward drives and two different reverse drives.

The present invention may be employed with great advantage when applied to motor driven vehicles, but it is, of course, to be understood that it has many other applications, as will become more apparent with the progress of the description to hereinafter follow.

My present improved transmission, like that of each of my aforesaid patents, is associated with an accelerating and reverse transmission positioned intermediate the power unit shaft and the propeller shaft of a motor vehicle. Obviously the weight of the entire transmission, so far as the vehicle is concerned, will be a sprung weight.

My present transmission is similar to the transmission mechanism disclosed in each of the first two of the aforesaid patents in that it utilizes a speed range mechanism including a spur pinion and an internal gear with a clutch socket. The advantages of such a construction were fully set out in my previous patents. It is evident that the principle of these advantages has to do with the minimizing of chattering, bearing wear, and gear wear.

In accordance with the general features of my invention, I provide a transmission wherein the three speeds forward and the one speed reverse of an accelerating and reverse transmission may be varied by an internal gear arrangement of an auxiliary transmission. The accelerating and reverse transmission is combined in such a manner with my novel auxiliary transmission unit, that the result is an unusually compact and efficient transmission. In fact, I have so combined the transmission that the resultant construction occupies a minimum of space and yet, at the same time, affords adequate bearing support for the movable parts and shafts of the mechanism.

Another advantage of my construction lies in the arranging of the low speed gear and the reverse idler so that they will be out of mesh with the driven parts when the vehicle is being operated at normal speeds. Thus it will be seen that an unusually quiet and efficient transmission of power will be effected.

In my present improvement in transmissions the distance between the bearings of the stub shaft associated with the internal gear member is maintained at a minimum, whereby the stub shaft is movable axially in the bearings. Also I preferably spline one of the bearings associated with the stub shaft to the inner wall of the associated casing for enabling it to be moved axially with the stub shaft, thus affording adequate bearing support for the stub shaft throughout its range of axial movement. Moreover, the stub shaft and its gear member are movable laterally with the casing and bearing associated therewith to enable the gear to be meshed with either the internal gear or the clutch socket, as the case may be. Thus it will be obvious that I have provided maximum support for the stub shaft irrespective of the fact that it is movable both axially and laterally.

Another advantage of my present invention pertains to the manner in which I lock the shiftable stub shaft in either of two positions. This locking arrangement necessitates an axial movement of the stub shaft and its associated pinion before the pinion can be moved laterally. Thus the pinion will be first moved axially out of engagement with the associated internal gear before it is moved into another position.

Still another feature of my invention relates to the internal gear member itself which is provided with a clutch socket and an internal gear on its inner periphery, and a plurality of spur gear teeth on its outer periphery which are adapted to mesh with either the low speed gear or the reverse idler, as the case may be.

A further feature of my invention has to do with the manner in which I combine and connect the low speed gear with a reverse idler.

Furthermore, in the accelerating and reverse transmission of my change speed device, the counter shaft preferably comprises a sleeve mounted upon a stationary shaft, which serves as a pivot bolt or rod for the pivotal casing associated with the laterally shiftable stub shaft of the auxiliary transmission. The gears carried by this sleeve are preferably secured thereto by means of splines, which are of such a construction as to rigidly maintain in place two of the gears and to permit axial movement of only the low speed gear.

A still further feature of my invention pertains to the novel speedometer hook-up. The speedometer shaft is preferably disposed at substantially right angles to the driven stub shaft of the auxiliary transmission and has a gear on its end adapted to mesh with the gear on the stub shaft. Now, the arrangement is such that upon the rocking of the stub shaft to shift the spur pinion associated therewith laterally, the gear carried thereby for driving the speedometer shaft, moves with the driven shaft and thereafter drives on a different part of the speedometer gear. That is to say, the gear on the stub shaft upon being moved with the stub shaft merely moves to another position where it meshes with and drives on a different part of the length of the gear carried by the speedometer shaft. This arrangement, as far as I am aware of, is novel in the art and affords an excellent solution as far as driving the speedometer shaft is concerned. If the speedometer shaft be inclined at a slight angle to the horizontal, then in either driving position of the swinging carriage, which carries the stub shaft and its pinion, the mesh with the speedometer pinion will be the same but at different points along the length of said speedometer pinion.

Other objects and advantages of my invention will more fully appear from the following detailed description, taken in connection with the accompanying drawings, which illustrate one embodiment thereof and, in which:—

Fig. 2 is a vertical sectional view taken on substantially the line 2—2 of Figure 1, looking in the direction indicated by the arrows;

Fig. 3 is a sectional view taken on the line 3—3 of Figure 2, looking in the direction indicated by the arrows;

Fig. 4 is a fragmentary sectional view taken on the line 4—4 of Figure 3, looking in the direction indicated by the arrows; and Fig. 5 is a sectional view taken on the line 5—5 of Figure 3, looking downwardly and illustrating the connection between the low speed gear and the reverse idler.

Figure 1:
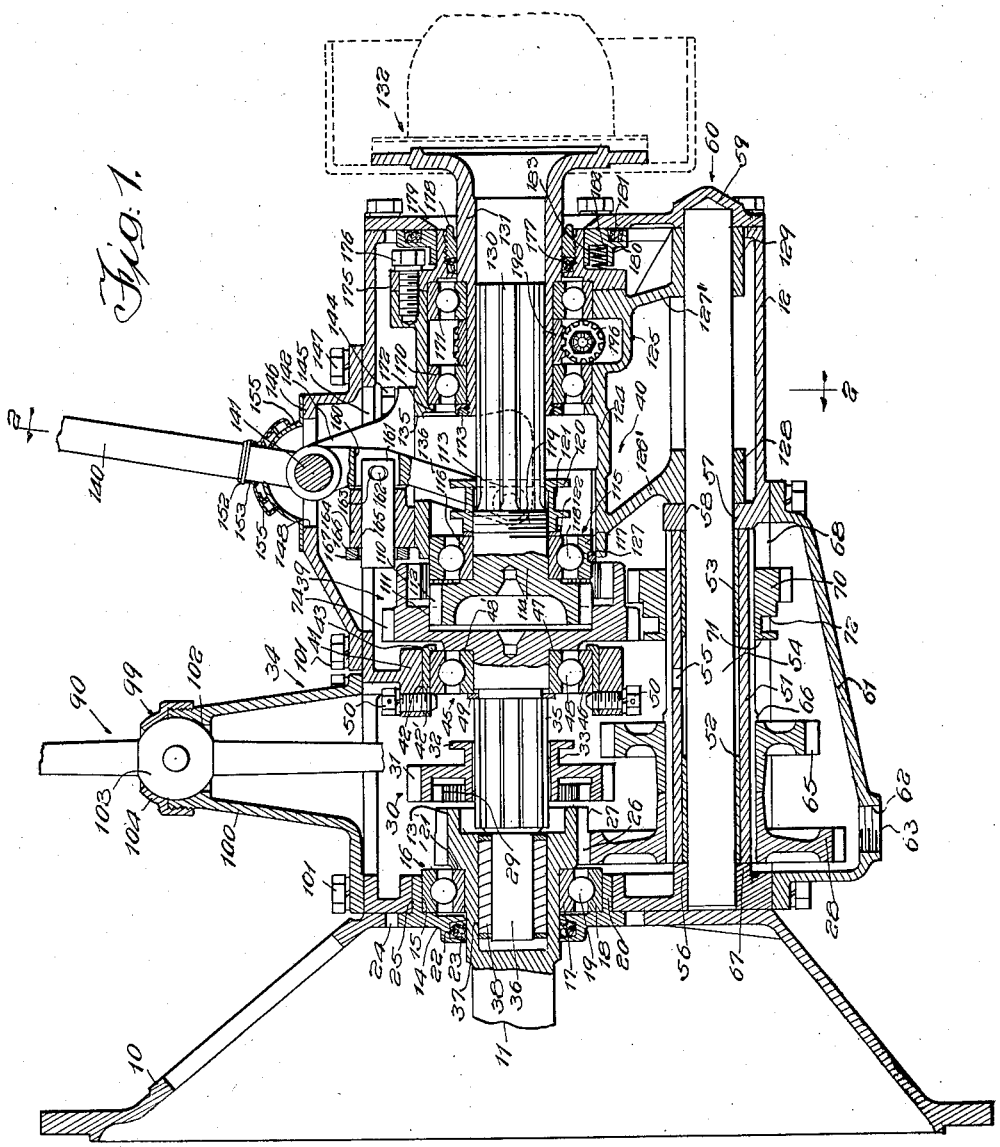
Figure 1 is a longitudinal sectional view of my novel transmission clearly illustrating the relation between the accelerating and reverse transmission and the auxiliary transmission.

Referring now to the drawings in detail in which like reference numerals designate similar parts throughout the several views, 10 denotes generally a housing such as the clutch housing of a motor vehicle. Extending through this housing is an intermediate or driving shaft 11 which is connected in any suitable or conventional manner, as through a suitable clutch, to the motor shaft of the vehicle. An end of this shaft 11 extends into a transmission housing 12. The end of the shaft inside this housing 12 is enlarged and formed into a gear 13. Surrounding the shaft 11 is an annular cap member 14 equipped with an annular cylindrical recess 15 for receiving a ball bearing 16. This ball bearing 16 includes inner and outer races 17 and 18 and a plurality of balls 19 positioned therebetween. The outer race fits inside the annular rim 20 of the member 14 and the inner race surrounds the shaft 11 intermediate the member 14 and a shoulder 21 formed by a gear 13.

The member 14, as is obvious from Figure 1, is provided with an annular groove 22 within which is disposed a felt construction comprising preferably a plurality of felt-like washers. The felt construction 23 surrounds the associated part of the shaft 11, which serves to prevent the leakage of the lubricant from the casing 12 into the clutch casing 10.

It should be noted that the annular cap member 14 extends into an annular opening 24 in the casing or housing 10. The casing or housing 10 may be secured to the housing 12 in any suitable or conventional manner. Also, it should be observed that the annular rim 20 of the member 14 is positioned within a circular opening 25 in the housing or casing 12. In other words, the bearing 16 is carried by the housing 12.

It should be observed that the teeth of the gear 13 comprise two separate and distinct portions 26 and 27. The portion 26 of the teeth is at all times in mesh with the teeth of a gear 28. The portion 27 of the teeth is adapted to mesh with the teeth 29 of an internal clutch on the gear 30. This gear 30 has formed on its periphery spur teeth 31, and has formed integral therewith a hub portion 32 having an annular shifting groove 33.

The gear 30 constitutes the high speed gear of an accelerating and reverse transmission, designated generally by the reference character 34. The gear 30 is splined to an intermediate stub shaft 35 positioned in axial alignment with the shaft 11. The shaft 35 has a reduced end 36 extending into an annular recess 37 in the end of the shaft 11. Positioned intermediate the reduced portion 36 and the wall of the annular recess 37, is a roller bearing unit 38, which constitutes an anti-frictional support for the end of the shaft 35.

The other end of the shaft 35 is enlarged and formed into an internal and external gear, designated generally by the reference character 39. This gear member 39 not only includes an internal gear, but also includes a clutch socket, such as that disclosed in my three Patents No. 1,495,782, No. 1,515,850 and No. 1,524,476. This member 39 constitutes an important part of my auxiliary transmission, designated generally by the reference character 40, and will be more fully explained hereinafter.

As best illustrated in Figure 1, the housing or casing 12 is provided with a cross web having an inwardly extending flange portion 41 equipped with an annular aperture 42 in which is disposed an annular sleeve 42' provided with an inwardly extending shoulder or flange portion 43. Disposed within the sleeve 42' is an anti-frictional or ball bearing unit 45 comprising an inner race 47, an outer race 46, and a plurality of balls 48 positioned intermediate the two races. It should be noted that the outer race 46 abuts the annular shoulder 43 of the sleeve 42'. The inner race 47 abuts an annular shoulder formed integal with the stub shaft 35. I have designated this shoulder generally by the reference character 48'. The inner race 47 is held against the shoulder 48' by means of a washer element 49 surrounding the stub shaft 35. The outer race 46 is held against the annular ring-like portion or shoulder 43 by means of a plurality of screws 50 threaded through the portion 42 and through the sleeve 42'. The ends of these screws are adapted to abut the edge of the outer race 46. Thus it will be readily apparent that I have provided a very rigid mounting for the ball bearing 45, which mounting may be readily disassembled to permit of access to the elements comprising the ball bearing 45 for the purpose of replacing or repairing the parts. The ball bearing 45 thus limits endwise movement of shaft 35 and takes up any endwise thrust.

The previously mentioned spur gear 28 is keyed to a sleeve 51 which is mounted upon a shaft 54. Positioned intermediate the sleeve 51 and the shaft 54 are a pair of spaced bushings 52 and 53. Also, the sleeve 51 is provided with an aperture 55 through which the lubricant has access to the shaft 54. One end of the shaft 54 is mounted in the housing 12, as indicated at 56. Also, the casing 12 is provided with an extension 57 having an aperture 58 through which the shaft 54 extends. The other end of the shaft 54 is mounted in an aperture 59 in a clamping plate, designated generally by the reference character 60. Bolted to the under side of the casing or housing 12 is a bottom plate or sump 61. This plate 61 is equipped with a threaded aperture 62 within which is a plug 63. By removing the plug 63 the oil or other lubricant in the sump 61 may be drained. It should be observed in Figure 1 that the gears associated with the shaft 54 extend down into portions enclosed or defined by the bottom plate or sump 61.

Splined to the sleeve 51 is another spur gear 65 which abuts the gear 28. The two gears 28 and 65 are maintained in place on the sleeve 51 by means of an annular shoulder 66 formed in the splines of the sleeve 51. Thus it will be seen that the two gears 28 and 65 cannot be moved axially with respect to the sleeve 51. As will be described hereinafter, the gear 31 is adapted to be shifted into mesh with the gear 65. The sleeve 51 is positioned intermediate the portions 57 and 67 of the housing 12. The bushing 52 is positioned in proximity to the portion 67 and the bushing 53 is positioned in a contiguous relationship with the portion 57. It is evident from Figure 1 that the sleeve 51 is positioned immediately over an aperture in the lower part of the housing or casing 12 through which the gears 65 and 28 extend.

An axially movable gear 70 is keyed to the sleeve 51 immediately over the bushing 53. This gear 70 is equipped with a hub portion 71 provided with a shifting groove 72. The gear 70 is adapted to mesh with a gear 74 formed integral with the internal gear member 39. The gear 74 merely constitutes a plurality of gear teeth formed on the periphery of the internal gear member 39. The shaft 54, together with the sleeve 51, in reality constitutes the counter shaft of my accelerating and reverse transmission. Also, although three gears are mounted upon the sleeve 51, only one of them, namely, gear 70, is shiftable axially.

Positioned at one side of and parallel to the shaft 54 is an auxiliary shaft 75 (Figure 5), the ends of which are mounted in the casing 12. The casing 12 is enlarged at 76 in order to accommodate the gears mounted upon the shaft 75. Mounted upon this shaft 75 is a pair of integral gears 77 and 78. Gear 77 is smaller than gear 78. The two gears 77 and 78 are spaced by a hub portion 79, so as to span the gear 74. The gears 77 and 78 are slidable axially upon the shaft 75, as will become more apparent hereinafter. As best shown in Figures 4 and 5, disposed about the hub 79 is a clamping member 80 having a lateral extension 81 equipped with a shoe 82 or fork, adapted to fit in the groove 72 of the hub 71 associated with the gear 70. The shoe 82 is arcuate in shape so as to fit snugly in the groove 72. The clamping member 80 encircles about one-half of the periphery of the hub 79. Encircling the other half of the hub 79 is a semi-circular clamping piece 83 equipped with an upwardly extending arm 84 (Figure 4). The clamping pieces 80 and 83 are secured together by means of bolts 85. Now, it will be evident, that the gear 70 is adapted to move with the gears 77 and 78.

The gear 77 is adapted at all times to mesh with the gear 70. Now the gear 70, as previously mentioned, is adapted to mesh with the gear 74 to drive the internal gear member 33 at a relatively low speed. By moving the gear 70 out of mesh with the gear 74, the gear 78 may be moved into mesh with the gear 74, thus causing the internal gear 39 to be driven in a reverse direction. Now, when the clutch teeth 29 are in mesh with the clutch teeth 27 which are extensions of the teeth of gear 13, the gear member 39 will be driven direct. On the other hand, when the gear 31 is in mesh with the gear 65, the gear member 39 will be driven at what is called the second or intermediate speed. Moreover, the low speed, as previously pointed out, is obtained through the gear 70.

I shall now proceed to describe the gear shifting mechanism. Positioned in the upper part of the casing or housing 12, as best illustrated in Figures 3 and 4, are a pair of parallel rods 86 and 87. Both of these rods 86 and 87 extend through openings in an inwardly extending portion 88 of the housing 12. These rods 86 and 87 are movable axially through the means of a shift lever 90.

The upper end of the arm 84 surrounds the rod 86 and is secured thereto by means of a bolt 91 (Figure 4). The rod 87 carries a downwardly extending arm 92 (Figures 3 and 4) provided with an arcuate shaped fork 93 extending into the annular groove 33 of the gear 31. This arm 92 is secured to the rod 87 by any suitable fastening means. It should be observed that the arm 92 is equipped with a lateral extension 95 which projects towards the rod 86 (Figure 4). The end of this extension 95 is equipped with a grooved out portion 96 adapted to receive the lower end 97 of the shift lever 90. The portion of the rod 86 immediately opposite the grooved portion 96 is provided with a slot 98, which is adapted to accommodate the portion 97 of the shift rod 90 when it is moved out of engagement with the grooved portion 96.

As best illustrated in Figure 1, the shift lever 90 is provided with the universal joint 99 intermediate its ends. The lever extends through a housing 100 fastened to the housing 12 by means of bolts 101. The upper end of this housing 100 is provided with an opening 102 in which a ball portion 103 is adapted to seat. The ball portion 103 is formed integral with the lever 90 and is held in place in the opening 102 by means of a cap 104 threaded onto the top of the housing 100. Thus it will be evident that the lever 90 is adapted to have a universal movement. Moreover, by moving the end 97 of the lever 90 into engagement with the lateral extension 95, the gears 70 and 78 may be moved into or out of mesh with the gear 74 formed integral with the internal gear member 39. In other words, the arm 92 controls the low and the reverse speed of the transmission system. The end 97 of the lever 90 may also be moved into engagement with the slot 98 of the shaft 86. By moving the shaft or rod 86 in a direction towards the engine or power unit, the internal clutch member 29 of gear 31 may be moved into engagement with the clutch teeth 27 of the gear 13 to obtain a high speed drive. Also, by moving the clutch 29 out of mesh with the teeth 27, the gear 31 may be moved into engagement with the gear 65 on the counter shaft or sleeve 51 to obtain an intermediate or the so-called second speed drive. Thus it will be seen that the accelerating and reverse transmission 34 is capable of three different forward speeds, and one reverse speed.

I shall now proceed to describe in detail my novel gear and pinion construction comprising an auxiliary transmission 40, by means of which I am enabled to obtain six different speeds forward and two different reverse speeds.

The gear member 39 has formed integral therewith a relatively large internal gear 110. Also formed in the member 35 is a clutch socket member 111. The internal gear 110 and clutch socket 111 are adapted to be engaged alternately by a spur gear 112, preferably formed integral with a movable shaft 113. The clutch socket 111 is shallow so that only about half the length of pinion 112 extends into the same. This gives ample strength. The internal gear 110 is relatively deep so as to take the full length of pinion 112, so that here ample strength and low tooth pressures are provided. Surrounding a portion 114 of the shaft 113 is a ball bearing unit 115 comprising an inner fixed race 116, an outer slidable race 117, and a plurality of balls 118 positioned intermediate the two races.

The shaft 113 is also provided with a threaded portion 119 upon which is threaded an annular collar 120 equipped with a shifter groove 121. The collar 120 is adapted to maintain the inner race 116 tightly against the gear 112. Also, I preferably dispose the washer 122 intermediate the collar 120 and the inner race 116. The outer race 117 is confined in the bore 124 of a tubular member or casing 125. The casing 125 is provided with a keyway 126 to which the outer race 117 is splined by means of a key 127. This key 127 serves to prevent the rotation of the ball bearing unit. The ball bearing unit, however, is adapted to be moved axially with the shaft 113 and the collar 120.

The casing 125 is equipped with downwardly extending webs 126' and 127' provided with bearing portions 128 and 129, respectively, which surround the shaft 54. It is through these enlarged portions 128 and 129 that the entire casing 125 is adapted to be pivoted about the shaft 54 in order to permit the lateral movement of the internal gear 112, as will be more fully explained hereinafter.

The shaft 113 is also equipped with a keyed portion 130 which is splined to a sleeve 131, the shaft 113 being movable inside of the sleeve 131, as is obvious from Figure 1. The sleeve 131 is provided with a flanged end constituting a part of a coupling designated generally by the reference character 132. The coupling 132 may be of any conventional construction and is employed to connect the power driven sleeve 131 to a propeller shaft (not shown).

The casing or housing 125 is provided with an aperture 135 through which extends an arm 136 (Fig. 2) having a forked lower end 137. Connected pivotally to each end of the arcuate shaped portion 137 is an inwardly extending projection 138 having an arcuate shaped shoe 139 adapted to fit in the groove 121 of the collar 120. This arm 136 is adapted to be utilized to move the shaft 113 and its gear 112 axially within the housing or casing 125.

The arm 136 comprises a part of a shifting lever 140 pivoted intermediate its ends upon a pivot pin 141. The pivot pin 141 is carried by a pair of spaced brackets 142 and 143 bolted to the top of the casing 125 by means of bolts 144. These brackets 142 and 143 extend through an opening 145 in the top of the housing 12. The opening 135 is enclosed by a closure plate 146 secured to the top of the casing 12 by means of bolts 147. The top of this plate 146 is equipped with an opening 148 through which extends the lever 140. The opening 148 in the plate 146 is covered by a cover piece 150 secured to the plate 146 by means of bolts 149. The cover piece 150 has an opening 151 which defines the degree of lateral movement of the lever 140. The lever 140 is equipped with a small annular shoulder 152 (Figure 2) against which abuts an end of a spring 153. The spring 153 is adapted to at all times urge a movable cover plate into engagement with the top of the cover piece 150. I have designated the cover plate by the reference character 155.

It will be obvious from Figures 1 and 2 that by moving the shift lever 140 laterally, the plate 155 will follow with the lever 140 to at all times maintain the opening 151 closed. In other words, the plate 155 constitutes a movable closure piece. The spring 153 serves to at all times urge this closure piece into tight engagement with the top of the cover plate 150.

As best illustrated in Figure 1, the arm 136 is equipped with a recess 160 into which extends an end of a small rod 161. The rod 161 is pivotally attached to the arm 136 by means of a pin 162. The pin 162 is loosely mounted within an opening 163 in the rod 161, so as to enable a certain amount of universal movement between the rod and the lever when the lever is actuated. The rod 161 extends through an opening 165 in a block 164 disposed on top of the casing 125. An end of the rod 161 is adapted to be projected into a circular aperture 166 in a cross plate 167. The cross plate 167 may be secured to the casing 12 in any desirable manner. This cross plate has two apertures 166 for receiving an end of the pin or rod 161, depending upon the position of the pinion 112. That is to say, the pinion 112 has two operating positions. The plate 167 co-operates with the pin 161 to lock the shaft into whatever position it is moved by the lever 140.

Referring once more to the stub shaft 113, it will be noted that a pair of ball bearings 170 and 171 are disposed intermediate the outer periphery of the sleeve 131 and the inner wall of the casing 125. The outer race of the ball bearing unit 170 is maintained in place by an annular shoulder 172 formed integral with the casing 125, and the inner race of the ball bearing unit 170 is maintained in place on the sleeve 131 by means of a nut threaded onto the end of the sleeve 131. I have designated this nut by the reference character 173. As shown in Figure 1, a lock washer may be positioned intermediate the nut 173 in the inner race of the bearing, if it is so desired.

Also, surrounding the sleeve 131 is a plate 175 secured to the casing 125 by means of bolts 176. This plate 175 is provided with an annular groove in which is disposed a plurality of ring-like washers, designated generally by the reference character 177. These washers 177 serve to prevent oil from leaking out of the casing 12 around the sleeve 131. The felt washers 177 are maintained in place by an annular gland element 178 threaded into the plate 175 around the sleeve 131. It should be observed that the sleeve 131 extends through an aperture 179 in the previously described plate 60. Surrounding a portion of the plate 175 is an annular member 180, which abuts the closure plate 60. This member 180 is provided with an annular groove in which is disposed a plurality of felt washers 181 abutting the plate 60. The member 180 has a plurality of apertures 182 for receiving springs 183 disposed intermediate the plate 175 and the member 180. These springs serve to urge the member 180 towards the plate 60.

Referring to Figure 2, it will be observed that the casing 125 is equipped with an aperture 190 thru which extends a speedometer shaft housing 191. This housing 191 is disposed in a substantially horizontal position and has an end mounted in a slot 192 in the housing 12. The speedometer shaft housing 191 may be secured to the housing 12 in any desirable manner, such, for example, as by means of a shoulder 193. Extending through this housing 191 is the speedometer shaft proper 194, the outer end of which is threaded as indicated at 195 to facilitate its being connected to any suitable driving element associated with the speedometer on the dash. The other end of the shaft 194 has secured thereto a small skew gear 196 held in place by means of a castellated nut 197. The gear 196 is positioned intermediate the ball bearing units 170 and 171, as illustrated in Figure 1. Surrounding the sleeve 131 and secured thereto is a skew gear 198 adapted to mesh with the speedometer shaft gear 196. Now, it will be obvious that the gear 198 may be shifted or rocked with the shaft 113 and yet, at the same time, drive the speedometer shaft gear 196. In other words, the gear on the sleeve 131 will have a part of its periphery in mesh with the speedometer shaft gear 196. Upon the moving of the gear 198 with the stub shaft 113, it is adapted to mesh with and drive at a different longitudinal part of the periphery of the speedometer shaft gear 196, thus insuring at all times a driving connection between the stub shaft 113 and the speedometer shaft irrespective of the position of the stub shaft 113.

As best illustrated in Figure 2, it will also be noted that a set screw 200 is threaded through the casing 12 and is adapted to have its inner end abut the casing 125 to limit the movement of the casing 125 in one direction. The screw bolt 200 constitutes a stop member and is adjustable through the means of a nut 201 threaded thereon. Of course, it is to be understood that the opening 151 in the top piece 150 will also serve to limit the movement of the lever 140.

The operation of my novel transmission is believed to be obvious from the above detailed description. Inasmuch as I have already described the manner in which the gears of the accelerating and reverse transmission 34 are shifted by the lever 90, I shall now proceed to describe the operation of the auxiliary transmission unit 40.

As previously described, the accelerating and reverse transmission 34 is capable of three speeds forward and one speed reverse. By employing my novel auxiliary transmission unit 40, each of these speeds may be stepped up or reduced, as the case may be. In other words, the transmission 40 enables the entire transmission construction to be capable of having six speeds forward and two speeds reverse. Obviously, when the gear or pinion 112 is in engagement with the clutch socket 111 of the internal gear member 39, a direct drive will result between the internal gear member 39 and the sleeve 131. In order to move the pinion 112 into engagement with the other internal gear 110 it is necessary to first actuate the pinion 112 axially out of engagement with the internal gear or socket 111. This axial movement of the stub shaft 113 is accomplished by moving the lever 140 about its pivot 141 towards the accelerating and reverse transmission. This movement of the stub shaft 113 not only actuates the gear 112, but also causes the ball bearing unit 115 to be moved therewith within the casing 125. The end of the stub shaft 113 is adequately supported at all times by the sleeve 131 which it telescopes; the sleeve 131 being supported by the ball bearing units 170 and 171.

Once the gear 112 is clear of the clutch socket 111 and the internal gear 110, the shaft 113 may be shifted laterally by the lever 140 to bring the gear 112 into alignment with the teeth of the internal gear 110. Then, by shifting gear 112 backwards axially, its teeth may be moved into mesh with the teeth of the gear 110, thus causing the sleeve 131 to be driven at different speeds than is the case when the pinion 112 is in mesh with the clutch socket 111.

In moving the shaft 113 axially the pin 161 will be moved clear of the associated aperture 166 in the cross plate 167. Thereafter, the lever 140 may be actuated to shift the entire shaft 133 laterally until the casing abuts the end of the stud or screw 200. It is to be understood that the stud or screw 200 serves to limit the movement of the casing in one direction, as indicated in Figure 2. Of course, the pin 161 will also be moved back into the other aperture 166 in the plate 167 to lock the shaft against displacement.

Now I desire it understood that although I have described in detail the preferred embodiment of my invention, the invention is not to be limited thereby, but only in so far as defined by the scope and spirit of the appended claims.

I claim:

1. In combination, an internal gear member comprising a plurality of parts including an internal gear and a clutch socket, a spur gear adapted to co-operate with said internal gear member, a shaft connected to the said spur gear, a sleeve telescoped by the said shaft and driven thereby, said shaft being shiftable axially within said sleeve, an antifrictional bearing for the said shaft shiftable axially therewith, a case enclosing said shaft and said sleeve, and in which said bearing is movable, a connection between said bearing and said casing for preventing said bearing from rotating with said shaft, and means for shifting said shaft axially to move said spur gear out of engagement with one of the parts of the internal gear member and for thereafter moving it into engagement with the other part.

2. In combination, an internal gear member comprising a plurality of parts including an internal gear and a clutch socket, a spur gear adapted to co-operate with said internal gear member, a shaft connected to said spur gear, a sleeve telescoped by the said shaft and driven thereby, said shaft being shiftable axially within said sleeve, an anti-frictional bearing for the said shaft shiftable axially therewith, a casing enclosing said shaft and said sleeve and in which the bearing is movable, a connection between said bearing and said casing for preventing said bearing from rotating with said shaft, and means for shifting said shaft axially to move said spur gear out of engagement with one of the parts of the internal gear member and for thereafter shifting the shaft, the sleeve, and the casing, including the bearing associated therewith, laterally to move the spur gear into engagement with the other part of the internal gear member.

3. In combination, an internal gear member comprising a plurality of parts including an internal gear and a clutch socket, a spur gear adapted to co-operate with said internal gear member, a shaft connected to the said spur gear, a sleeve telescoped by the said shaft and driven thereby, said shaft being shiftable axially with said sleeve, a casing enclosing said shaft and said sleeve, a pair of bearings disposed intermediate said casing and said driven sleeve, a gear disposed intermediate the bearings and rotatable with the sleeve, a speedometer shaft extending through said casing at substantially right angles to said sleeve, a gear on the end of the said speedometer shaft at all times in mesh with said gear on the sleeve, and means for shifting the shaft axially to disengage the spur gear from one of the parts of said internal gear member, and for thereafter shifting the casing, sleeve, shaft, and bearings associated therewith laterally to move said spur gear laterally into engagement with the other of said parts, said gear on the sleeve being movable laterally therewith and being adapted to drive on a different part of said speedometer shaft gear.

4. In a transmission, a driving shaft having a low speed pinion, a lay shaft having a meshing low speed gear in mesh with the pinion and having an intermediate gear, an intermediate shaft in alinement with the driving shaft, a slidable gear splined on said intermediate shaft and adapted to clutch to said pinion or mesh with the intermediate gear on the lay shaft, a driven shaft, an internal gear member and a cooperating pinion member forming a gear connection between said intermediate shaft and said driven shaft, means for coupling said intermediate shaft and said driven shaft for a direct drive, said internal gear member having external gear teeth formed thereon, and a low speed pinion on the lay shaft adapted to be meshed with the external gear teeth on the internal gear member.

5. In a transmission, a driving shaft having a low speed pinion, a lay shaft having a meshing low speed gear in mesh with the pinion and having an intermediate gear, an intermediate shaft in alinement with the driving shaft, a slidable gear splined on said intermediate shaft and adapted to clutch to said pinion or mesh with the intermediate gear on the lay shaft, a driven shaft, an internal gear member and a cooperating pinion member forming a gear connection between said intermediate shaft and said driven shaft, means for coupling said intermediate shaft and said driven shaft for a direct drive, said internal gear member having external gear teeth formed thereon, a low speed pinion on the lay shaft adapted to be meshed with the external gear teeth on the internal gear member, and a reversing idler connectible between the low speed pinion on the lay shaft and the external gear teeth on said internal gear member.

6. In a transmission, a driving shaft, a lay shaft, a driven shaft, an intermediate shaft, change spur gears between said driving and said intermediate shafts, a pair of said gears being mounted on said lay shaft, an internal gear and clutch member and a spur gear and clutch member between the intermediate shaft and the driven shaft, and a swinging frame pivoted on said lay shaft, said driven shaft being journaled in said frame, a gear case for said transmission having a slotted end plate through which the driven shaft projects, and a slidable cover plate for the slot carried by said swinging frame.

In witness whereof, I hereunto subscribe my name this 8th day of June, 1926.

THOMAS L. FAWICK.